(12) United States Patent
Shen et al.

(10) Patent No.: US 8,219,395 B2
(45) Date of Patent: Jul. 10, 2012

(54) FRAME COMPENSATION METHOD AND SYSTEM

(75) Inventors: Ling Shen, Shenzhen (CN); Jianfeng Xu, Shenzhen (CN); Yaohua Guan, Shenzhen (CN); Wei Li, Shenzhen (CN); Lei Miao, Shenzhen (CN); Lijing Xu, Shenzhen (CN); Qing Zhang, Shenzhen (CN); Zhengzhong Du, Shenzhen (CN); Chen Hu, Shenzhen (CN); Yi Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 609 days.

(21) Appl. No.: 12/427,112

(22) Filed: Apr. 21, 2009

(65) Prior Publication Data

US 2009/0210237 A1    Aug. 20, 2009

Related U.S. Application Data (63) Continuation of application No. PCT/CN2008/071253, filed on Jun. 10, 2008.

(30) Foreign Application Priority Data

Jun. 10, 2007   (CN) .......................... 2007 1 0111687

(51) Int. Cl.
*G10L 21/02* (2006.01)
*G10L 19/00* (2006.01)
(52) U.S. Cl. ..................... 704/228; 704/226; 704/500
(58) Field of Classification Search .................. None
See application file for complete search history.

(56) References Cited

U.S. PATENT DOCUMENTS 6,055,497 A * 4/2000 Hallkvist et al. .............. 704/228
(Continued)

FOREIGN PATENT DOCUMENTS

WO    01/49005 A1    7/2004

OTHER PUBLICATIONS

Universal Mobile Telecommunications System (UMTS); Audio Codec Processing Functions; Extended Adaptive Multi-Rate Wideband (AMR-WB+) Codec; Transcoding Functions (3GPP TS 26.290 V6.2.0 Release 6), *ETSI Standards—Technical Specification 126 290*, 3-SA4(V6.2.0): 1-86 (Mar. 2005).

(Continued)

*Primary Examiner* — Brian Albertalli
(74) *Attorney, Agent, or Firm* — Leydig, Voit & Mayer, Ltd.

(57) ABSTRACT

A frame compensation method is provided. The method includes: obtaining a length of a lost frame and a length of a correct frame; determining that the length of the correct frame is integral power of 2 times of the length of the lost frame, and then obtaining a data sequence with the same length as the length of the lost frame according to the correct frame; and compensating the lost frame according to the data sequence to obtain a compensated data frame. A frame compensation system is also provided. Lost frames in various formats are compensated according to correct frames in various formats, so that the limitation of the related art that a lost frame in a single format can be merely compensated according to a correct frame in a single format is eliminated, and the effect of the compensated data frames is better than that of filling comfort noises.

11 Claims, 6 Drawing Sheets

U.S. PATENT DOCUMENTS

| | | | |
|---|---|---|---|
| 6,456,719 B1* | 9/2002 | Yuh | 381/106 |
| 6,584,438 B1* | 6/2003 | Manjunath et al. | 704/228 |
| 7,233,897 B2* | 6/2007 | Kapilow | 704/229 |
| 7,321,851 B2* | 1/2008 | Andrsen et al. | 704/211 |
| 7,519,535 B2* | 4/2009 | Spindola | 704/266 |
| 7,590,096 B2* | 9/2009 | El-Maleh et al. | 370/335 |
| 7,979,271 B2* | 7/2011 | Bessette | 704/219 |
| 2004/0181405 A1 | 9/2004 | Shlomot et al. | |
| 2005/0197830 A1* | 9/2005 | Lin | 704/201 |
| 2006/0015795 A1 | 1/2006 | Miura et al. | |
| 2006/0184861 A1* | 8/2006 | Sun et al. | 714/776 |
| 2006/0253279 A1 | 11/2006 | Sung | |

OTHER PUBLICATIONS

Office Action in corresponding European Application No. 08757664.1 (Feb. 1, 2011).

Written Opinion of the International Searching Authority in corresponding PCT Application No. PCT/CN2008/071253 (Sep. 25, 2008).

Sjoberg et al., "RTP Payload Format for the Extended Adaptive Multi-Rate Wideband (AMR-WB+) Audio Codec," Jan. 2006, The Internet Society, Reston, Virginia.

"3GPP TS 26.090—3rd Generation Partnership Project; Technical Specification Group Services and System Aspects; Mandatory Speech Codec speech processing functions; Adaptive Multi-Rate (AMR) speech codec; Transcoding functions (Release 9)," Dec. 2009, Version 9.0.0, $3^{rd}$ Generation Partnership Project, Valbonne, France.

"3GPP TS 26.091—3rd Generation Partnership Project; Technical Specification Group Services and System Aspects; Mandatory Speech Codec speech processing functions; Adaptive Multi-Rate (AMR) speech codec; Error concealment of lost frames (Release 9)," Dec. 2009, Version 9.0.0, $3^{rd}$ Generation Partnership Project, Valbonne, France.

"3GPP TS 26.190—3rd Generation Partnership Project; Technical Specification Group Services and System Aspects; Speech codec speech processing functions; Adaptive Multi-Rate—Wideband (AMR-WB) speech codec; Transcoding functions (Release 9)," Dec. 2009, Version 9.0.0, $3^{rd}$ Generation Partnership Project, Valbonne, France.

"3GPP TS 26.191—3rd Generation Partnership Project; Technical Specification Group Services and System Aspects; Speech codec speech processing functions; Adaptive Multi-Rate—Wideband (AMR-WB) speech codec; Error concealment of erroneous or lost frames (Release 9)," Dec. 2009, Version 9.0.0, $3^{rd}$ Generation Partnership Project, Valbonne, France.

"3GPP TS 26.290—3rd Generation Partnership Project; Technical Specification Group Service and System Aspects; Audio codec processing functions; Extended Adaptive Multi-Rate—Wideband (AMR-WB+) codec; Transcoding functions (Release 9)," Dec. 2009, Version 9.0.0, $3^{rd}$ Generation Partnership Project, Valbonne, France.

* cited by examiner (Prior Art)
FIG. 1

FRAME COMPENSATION METHOD AND SYSTEM

CROSS-REFERENCE TO RELATED APPLICATIONS

This application is a continuation of International Patent Application No. PCT/CN2008/071253, filed Jun. 10, 2008, which claims priority to Chinese Patent Application No. 200710111687.6, filed Jun. 10, 2007, both of which are hereby incorporated by reference in their entirety.

FIELD OF THE INVENTION

The present invention relates to a media data coding field, and more particularly to a method and a system for data frame lost-packet compensation.

BACKGROUND

An extended adaptive multi-rate wideband (AMR-WB+) codec is a voice audio codec, which is capable of selecting a voice coding mode according to signal characteristics, for example, algebraic code excited linear prediction (ACELP) coding, or selecting an audio coding mode, for example, transform coded excitation (TCX) coding. At a closed-loop encoding end of the AMR-WB+ codec, the coding modes of both TCX and ACELP are adopted for coding an input audio signal, and signal-to-noise ratios of the signal after being coded by the two coding modes are compared. If the signal noise ratio (SNR) of the signal coded by the TCX coding mode is higher, data coded by the TCX coding mode serves as a bitstream and is sent to a receiving end; otherwise, data coded by the ACELP coding mode serves as a bitstream and is sent to the receiving end.

The TCX coding mode is classified into three types: TCX256 (256 sampling points are taken as one coding unit), TCX512 (512 sampling points are taken as one coding unit) and TCX1024 (1024 sampling points are taken as one coding unit). At the closed-loop encoding end of the AMR-WB+, when the TCX1024 mode is adopted for coding a data frame (briefly referred to as a TCX1024 frame below), a part of the frame is lost, and if the previous frame is also a TCX1024 frame, the previous correct frame may serve as a compensation basis to compensate the lost frame, and various compensation modes may be adopted, including spectrum interpolation and linear prediction.

The spectrum interpolation of the compensation mode includes performing interpolations on amplitude and phase respectively, which is based on the characteristic that the amplitude and phase of a data signal both have certain continuity. The amplitude interpolation includes the following steps.

A spectrum amplitude of a previous frame is calculated by: $oldA[k]=|old\hat{X}(k)|$, $k=1, 2, \ldots$.

A spectrum amplitude of a current frame is calculated by: $A[k]=|\hat{X}(k)|$, $k=1, 2, \ldots$.

An amplitude gain is calculated according to a spectrum amplitude in the current frame that is not lost and has a non-zero amplitude and a spectrum amplitude in the previous frame at a corresponding position by:

$$gain = \sqrt{\frac{\sum_{k, A[k] \neq 0} A[k]^2}{\sum_{k, oldA[k] \neq 0} old\ A[k]^2}}, k = 1, 2, \ldots$$

Therefore, a spectrum amplitude of a lost frame is calculated based on the gain calculated above by: $A[k]=gain \cdot oldA[k]$.

Before introducing the phase interpolation, a data transmission mode through packetization is illustrated. The raw data are $[0,1,2,3,4,5,6,7,8, \ldots]$, in which $[0,1,2,3]$ respectively indicate a first, second, third, and fourth datum, and so forth. Accordingly, the data are divided into four sub-frames as follows:

Sub-frame 1 $\{[0,1,2,3], [16,17,18,19], \ldots\}$, sub-frame 2 $\{[4,5,6,7], [20,21,22,23], \ldots\}$, sub-frame 3 $\{[8,9,10,11], [24,25,26,27], \ldots\}$, and sub-frame 4 $\{[12,13,14,15], [28,29,30,31], \ldots\}$.

If a certain sub-frame is lost when receiving data, compensation is required by using a previously-received correct frame. The compensation is similar to the principle of the amplitude interpolation, i.e., processing by using the phase information of the previously-received correct frame. For example, if the data frame $[K+1, \ldots, K+N-1]$ is lost when receiving data, a compensation can be made by using the correctly received K and K+N.

It is assumed that $\phi(K)$ and $\phi(K+N)$ are already known, and the phase values between them can be interpolated by the following formula:

$$\hat{\varphi}(k) = \hat{\varphi}(k-1) + \Delta\ old\ \varphi(k) + \Delta\varphi_c, k = K+1, \ldots, K+N-1$$

wherein, $\Delta\ old\ \varphi(k) = old\ \varphi(k) - old\ \varphi(k-1)$, and $$\Delta\varphi_c = \frac{[\varphi(K+N) - \varphi(K)] - [old\ \varphi(K+N) - old\ \varphi(K)]}{N}.$$

Each data string in the lost sub-frame needs to be re-calculated. For example, if the sub-frame 2 is lost, $[4,5,6,7]$ and $[20,21,22,23]$ both need to calculate the $\Delta\phi_c$ once, and so forth.

For $\phi(K)$ and $\phi(K+N)$ of the correctly received data, several value acquisition modes in different circumstances are illustrated below. In a circumstance that taking no consideration at the two ends, i.e., an error data string has correctly received data on two sides thereof, for example, when the sub-frame 1 is lost, the data string $[16,17,18,19]$ is lost, the data $[15]$ and $[20]$ are correctly received, and both $\phi(K)$ and $\phi(K+N)$ get the actual data. If the data loss occurs at a front end of the frame, i.e., the lost data does not have correct data at the front end thereof, $K=0$, $\phi(K)=\phi(0)=0$, and $\phi(K+N)$ acquires an actual value. If the data loss occurs at a rear end of the frame, i.e., the lost data does not have correct data at the rear end thereof, $\phi(K+N)=0$, and $\phi(K)$ acquires an actual value.

Figure 1:
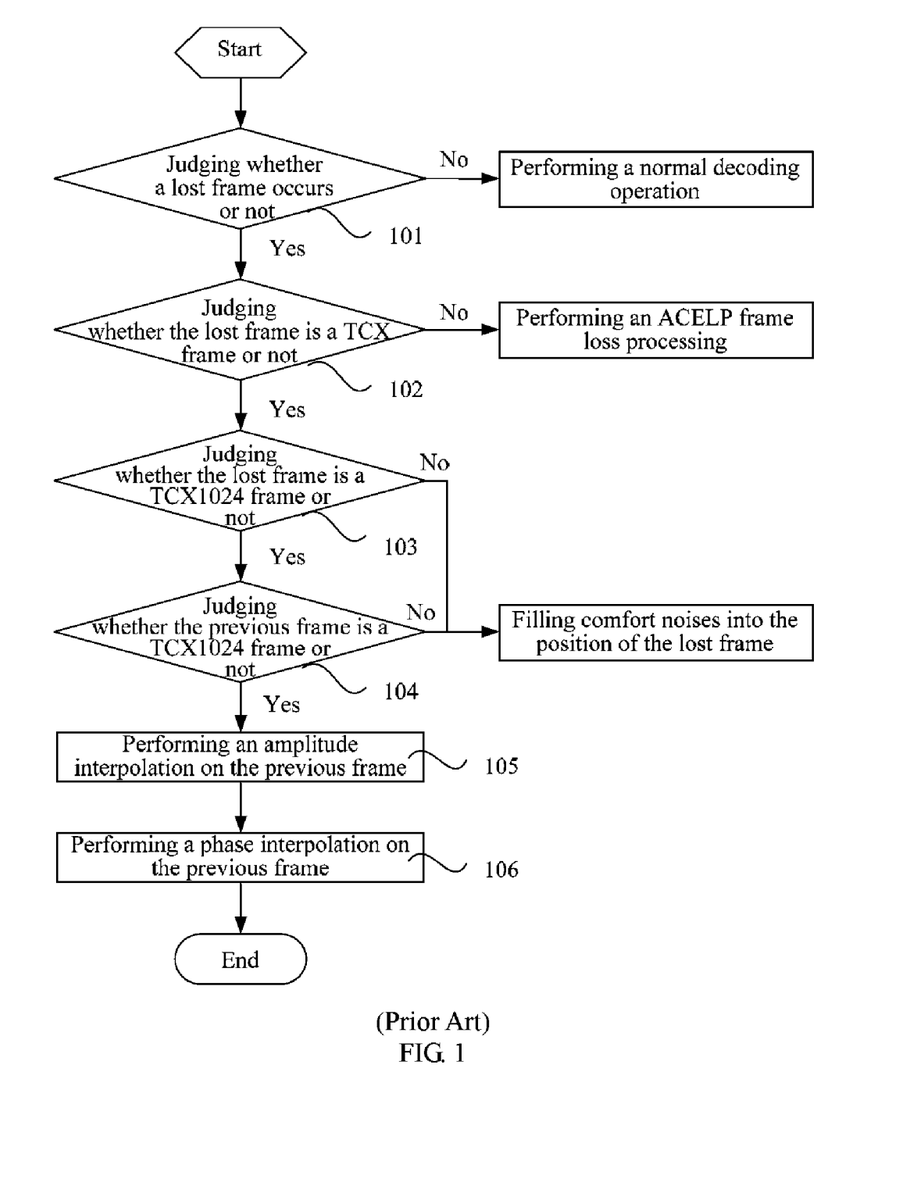
FIG. 1 is a schematic flow chart of a frame compensation method in the related art.

However, in the existing compensation solution of the AMR-WB+ codec, the compensation cannot be performed unless the current frame is a TCX1024 and the previous frame is also a TCX1024, and the current lost frame is compensated according to the data of the previous correct frame. FIG. 1 is a schematic flow chart of a frame compensation method in the related art. Referring to FIG. 1, the method includes the following steps.

In step 101, it is judged whether a data loss occurs in a received data frame, i.e., whether the data frame is a lost frame or not, and if a data loss does not occur in a received data frame, a normal decoding operation is performed.

In step 102, it is judged whether the current lost frame is a TCX frame or not, and if the current lost frame is the TCX frame, step 103 is performed; otherwise, a corresponding non-TCX frame loss processing is performed on the lost frame. As the AMR-WB+ codec only adopts the coding modes of TCX and ACELP, if the lost frame is not a TCX frame, i.e., the lost frame is an ACELP frame, a frame loss processing under the ACELP coding mode is performed.

In step 103, it is judged whether the lost frame is a TCX1024 frame or not, and if the lost frame is the TCX1024 frame, step 104 is performed; otherwise, comfort noises are filled into the position of the lost frame.

In step 104, it is judged whether the previous frame is a TCX1024 frame or not, and if the previous frame is the TCX1024 frame, step 105 is performed; otherwise, comfort noises are filled into the position of the lost frame.

In step 105, an amplitude interpolation is performed on the previous frame, and the specific amplitude interpolation manner has been described above.

In step 106, a phase interpolation is performed on the previous frame to obtain a compensated data frame, and the specific phase interpolation manner has been described above.

The method for compensating a TCX1024 frame provided in the related art is only applicable to the compensation of frames in a single format (TCX1024 frame). When the correct frame or lost frame is in a format other than the TCX1024 frame, filling comfort noises is the only way for processing, which affects the reception quality at the receiving end to some extent.

SUMMARY

Accordingly, the present invention is directed to a frame compensation method and a frame compensation system, which are adapted to perform compensations in various circumstances by using a codec in a TCX coding mode if a packet loss occurs when receiving data.

In order to achieve the above objective, a frame compensation method is provided in an embodiment of the present invention. The method includes the following steps.

A length of a lost frame and a length of a correct frame are obtained.

It is determined that the length of the correct frame is integral power of 2 times of the length of the lost frame, and a data sequence with the same length as the length of the lost frame is obtained according to the correct frame.

The lost frame is compensated according to the data sequence to obtain a compensated data frame.

In order to achieve the above objective, a frame compensation system is provided in an embodiment of the present invention. The system includes a first length obtaining module, a second length obtaining module, a data sequence obtaining module, and a compensation module.

The first length obtaining module is adapted to obtain a length of a lost frame.

The second length obtaining module is adapted to obtain a length of a correct frame.

The data sequence obtaining module is connected to the first length obtaining module and the second length obtaining module, and adapted to obtain a data sequence with the same length as the length of the lost frame according to the correct frame when determining that the length of the correct frame is integral power of 2 times of the length of the lost frame.

The compensation module is connected to the data sequence obtaining module, and adapted to compensate the lost frame according to the data sequence to obtain a compensated data frame.

Based on the above technical solutions, in the embodiments of the present invention, lost frames in various formats are compensated according to correct frames in various formats, so that the limitation of the related art that a lost frame in a single format can merely be compensated according to a correct frame in the same single format is eliminated, and the effect of compensating a data frame is better than that of filling comfort noises.

DETAILED DESCRIPTION OF THE EMBODIMENTS

The technical solutions of the present invention are illustrated in detail below through the embodiments with reference to the accompanying drawings.

Figure 2:
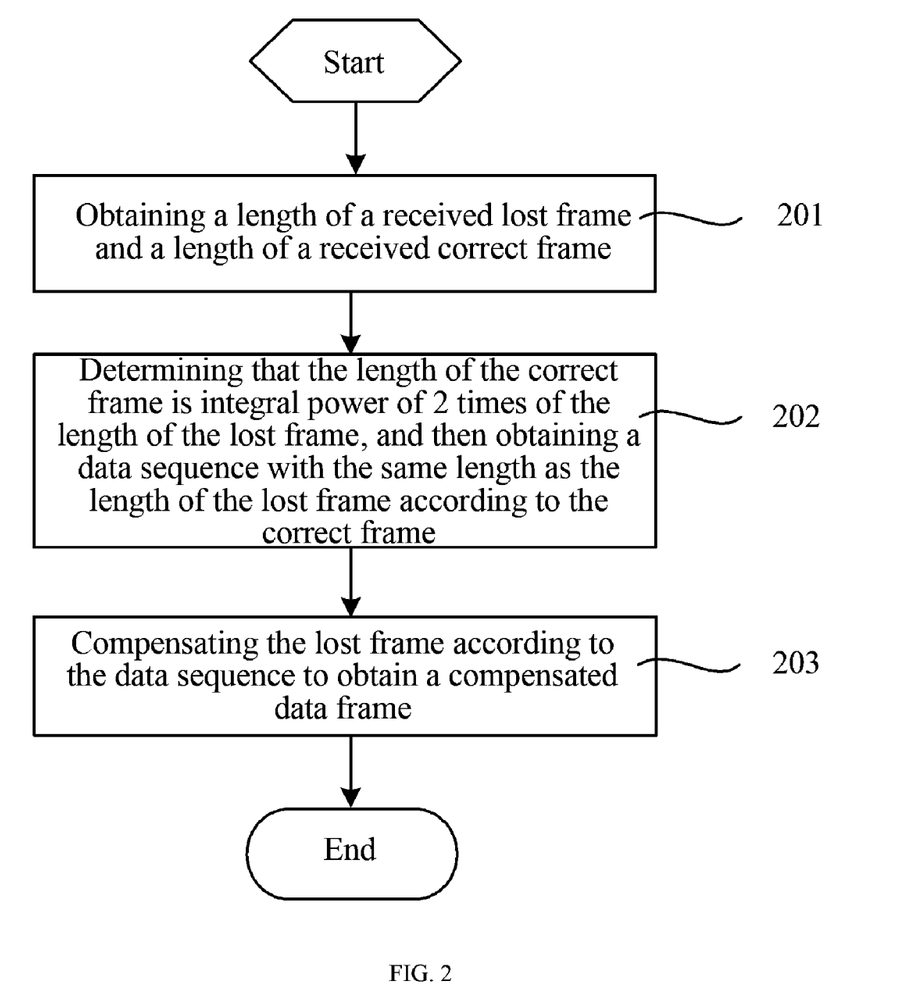
FIG. 2 is a schematic flow chart of a frame compensation method according to a first embodiment of the present invention.

FIG. 2 is a schematic flow chart of a frame compensation method according to a first embodiment of the present invention. The method includes the following steps.

In step 201, upon receiving a data frame, a receiving end of a codec judges whether a data loss occurs in the received data frame or not, that is, whether the received data frame is a lost frame or not. If a data loss occurs in the received data frame, a length L1 of the lost frame is obtained, and a length L2 of a data frame (i.e., a correct frame) completely received before the lost frame is also obtained. A data sequence of the lost frame is represented by X1, a data sequence of the correct frame is represented by X2, and the length of the data frame indicates the number of the data in the data sequence of the data frame.

In step 202, when the codec determines that the length L2 of the correct frame is integral power of 2 times of the length L1 of the lost frame, i.e., $L2 = 2^n \cdot L1$, in which n is an integer, obtains a data sequence with the same length as the length L1 of the lost frame according to the correct frame, and the data sequence is represented by X2'.

In step 203, the codec compensates the lost frame according to the data sequence X2' to obtain a compensated data frame.

In this embodiment, during compensation, a corresponding compensation basis is selected according to the data loss situation in the lost frame. When it is determined that a whole frame is lost, a data sequence with the same length as the length of the whole lost frame can only be adopted for spectrum interpolation, and when it is determined that a part of the data in the frame is lost, the lost frame is compensated according to the other part of the data that is not lost in the lost frame and the obtained data sequence.

The compensation manner may adopt any mode in the related art, for example, spectrum interpolation or linear prediction, and may also directly take the obtained data sequence as a compensation for the lost frame. In addition, the present invention is not limited to the above compensation modes.

The codec may adopt, but not limited to, an AMR-WB+ codec, and any codec using the TCX coding mode is applicable to this embodiment. In this embodiment, the lost frame and the correct frame may be any data frame in the TCX coding mode. In addition to the TCX1024 frame, other data frames coded by the TCX coding mode such as the TCX512 frame or TCX256 frame can also adopt the method of this embodiment for frame compensation.

The multiple relations between the length of the correct frame and that of the lost frame are respectively described below in the following embodiment.

When the codec determines that the length L2 of the correct frame is positive integral power times of the length L1 of the lost frame, i.e., the multiple is a positive integral power, an appropriate sequence can be selected from the data sequence X2 of the correct frame to serve as the compensation basis. For a signal in a temporarily stable state, the spectrums of the two adjacent segments of the signal are in a similar shape. Thus, when it is determined that the data at a certain frequency point of one segment of the signal is lost, a data at the adjacent segment of the signal corresponding to the frequency point serves as the compensation basis. In a frequency domain, it is determined that the lengths of two adjacent data sequences are respectively L and $2^n \cdot L$, and if a data in a data frame with the length of L appears at a frequency of $n_1 \pi/L$, a data in a data frame with the length of $2^n \cdot L$ appears at $n_2 \pi/(2^n L)$, so that the data at $2^n$ positions in the data frame with the length of $2^n \cdot L$ may be adopted to constitute a data sequence for compensating the data frame with the length of L.

A data sequence with the same length as the length of the lost frame is selected from the correct frame by the following formula:

$$X2'(k) = X2(2^n \cdot k), k=1, 2, \ldots, L$$

wherein X2 is the data sequence of the correct frame, X2' is the selected and obtained data sequence, n is a positive integer, and L is the length of the lost frame.

Figure 3:
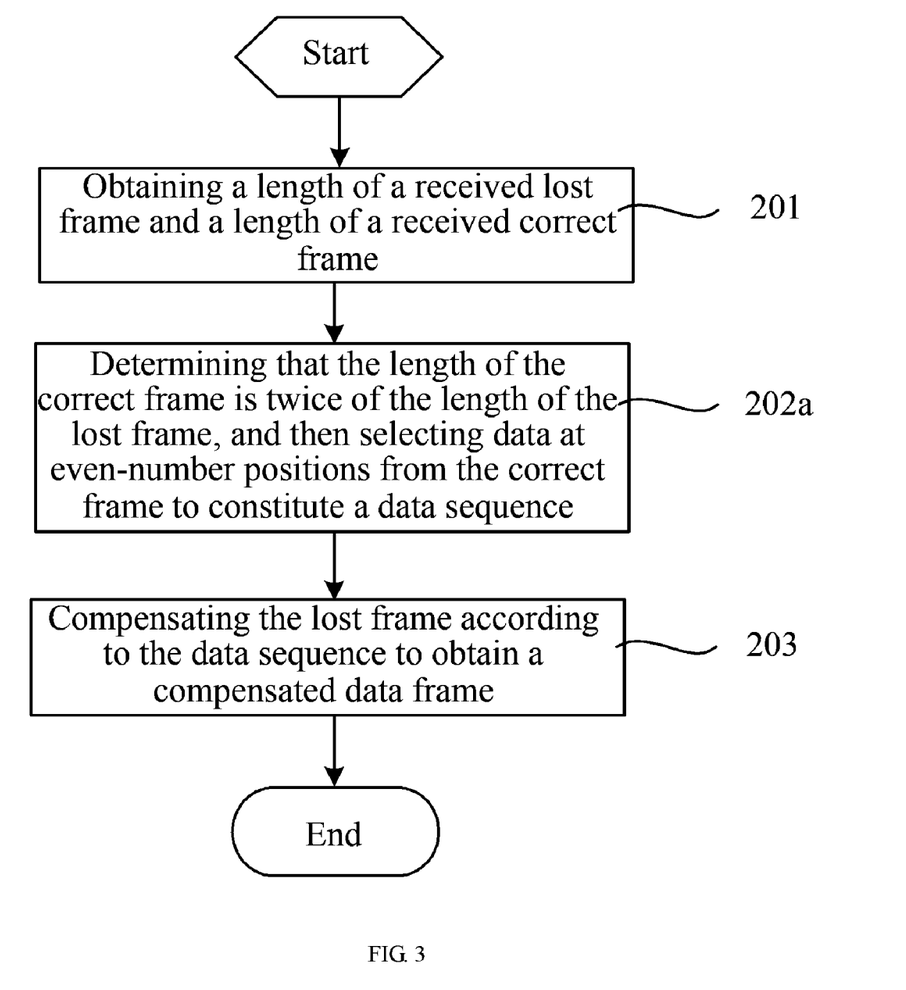
FIG. 3 is a schematic flow chart of a frame compensation method according to a second embodiment of the present invention.

For example, the lost frame is a TCX512 frame and the correct frame is a TCX1024 frame. In this case, the length of the correct frame is 1024, the length of the lost frame is 512, and the length of the correct frame is twice of the length of the lost frame, i.e., at a multiple of $2^1$. FIG. 3 is a schematic flow chart of a frame compensation method according to a second embodiment of the present invention. In step 202a, when selecting a data sequence, the data at even-number positions in the correct frame are selected to obtain 512 data, and the 512 data constitute a data sequence that serves as a basis for compensating the lost frame. The specific compensation manner will not be illustrated in detail herein.

When the codec determines that the length L2 of the correct frame is negative integral power times of the length L1 of the lost frame, i.e., at a multiple of a negative integral power, a data sequence with the same length as the length of the lost frame is obtained by interpolating data into the correct frame, and serves as the compensation basis. As for a signal in a temporarily stable state, generally, the data may not change dramatically in a frequency domain, and a gradually changing period exists between two adjacent data points, so that the data that gradually changes may be interpolated between two adjacent data to obtain a data sequence.

The data is interpolated into the correct frame according to the following formula, so as to obtain a data sequence with the same length as the length of the lost frame:

$$X2'(k) = \begin{cases} X2\left(\dfrac{k}{2^n}\right), & k = 2^n, 2 \cdot 2^n, 3 \cdot 2^n \ldots, L \\ \left(1 - \dfrac{\mathrm{mod}\left(\dfrac{k}{2^n}\right)}{2^n}\right) \cdot X2\left(\left[\dfrac{k}{2^n}\right]\right) + & k = 1, \ldots, L-1, \text{ and} \\ \dfrac{\mathrm{mod}\left(\dfrac{k}{2^n}\right)}{2^n} \cdot X2\left(\left[\dfrac{k}{2^n}\right] + 1\right), & k \ne 2^n, 2 \cdot 2^n, 3 \cdot 2^n \ldots, L \end{cases}$$

In the above formula, X2 is the data sequence of the correct frame, X2' is the data sequence obtained after the data interpolation, n is a positive integer, L is the length of the lost frame, [ ] is a round down operator, and mod is a modulus operator. The interpolated data can be respectively calculated by the amplitudes and the phases of the data at two sides thereof.

Figure 4:
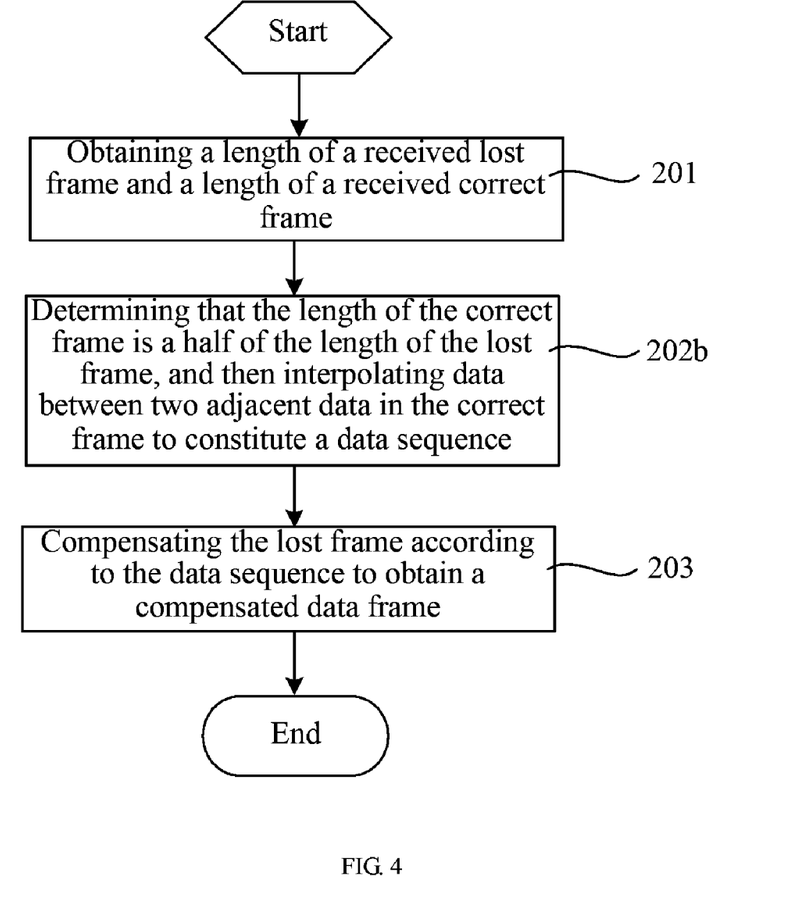
FIG. 4 is a schematic flow chart of a frame compensation method according to a third embodiment of the present invention.

For example, the lost frame is a TCX1024 frame and the correct frame is a TCX512 frame. Thus, the length of the correct frame is 512, the length of the lost frame is 1024, and the length of the correct frame is a half of that of the lost frame, i.e., at a multiple of $2^{-1}$. FIG. 4 is a schematic flow chart of a frame compensation method according to a third embodiment of the present invention. In step 202b, when a data x is interpolated between adjacent data x1 and x2, the amplitude of x is equal to a half of the total amplitude of x1 and x2, and the phase of x is equal to a half of the total phase of x1 and x2, so that the data in the correct frame and the interpolated data together constitute a new data sequence that serves as a basis for compensating the lost frame. The specific compensation method will not be illustrated in detail herein.

Besides that the length of the correct frame is positive and negative integral power of 2 times of the length of the lost frame, the multiple may also be 1, i.e., at a multiple of $2^0$. Thus, the correct frame can directly serve as the basis for compensating the lost frame. However, the correct frame and the lost frame are not limited to the TCX1024 frame.

As for a data stream that includes data frames other than TCX frames, upon receiving a lost frame, it needs to judge whether the lost frame is a TCX frame or not, and if the lost frame is not a TCX frame, a non-transform coding frame loss compensation operation is performed. Upon receiving a correct frame, it needs to judge whether the correct frame is a TCX frame or not, and if the correct frame is not a TCX frame, comfort noises are filled into the lost frame.

According to the frame compensation method provided in the above embodiments of the present invention, lost frames in various formats are compensated according to correct frames in various formats, so that the limitation of the related art that data frames in formats other than the TCX1024 frame cannot be compensated is eliminated, and the effect for compensating data frames is better than that of filling comfort noises.

Those of ordinary skill in the art should understand that, all or a part of the steps in the method according to the embodiments of the present invention may be implemented through instructing relevant hardware with a program. The program may be stored in a computer-readable storage medium. When the program is executed, the steps of the method according to the embodiments of the present invention are performed. The storage medium may be any medium that is capable of storing program codes, such as a ROM, a RAM, a magnetic disk, or an optical disk.

Figure 5:
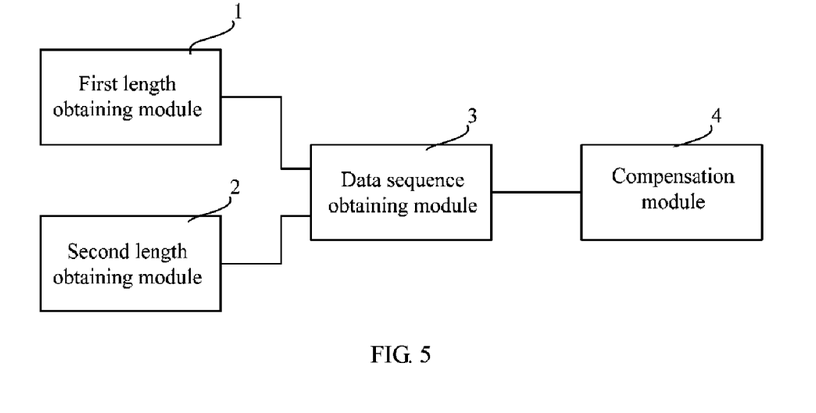
FIG. 5 is a schematic structural view of a frame compensation system according to a first embodiment of the present invention.

FIG. 5 is a schematic structural view of a frame compensation system according to a first embodiment of the present invention. In this embodiment, the frame compensation system includes a first length obtaining module 1, a second length obtaining module 2, a data sequence obtaining module 3, and a compensation module 4. The first length obtaining module 1 is adapted to obtain a length of a received lost frame, and the second length obtaining module 2 is adapted to obtain a length of a received correct frame.

The data sequence obtaining module 3 is connected to the first length obtaining module 1 and the second length obtaining module 2, and adapted to obtain a data sequence with the same length as the length of the lost frame according to the correct frame when it is determined that the length of the correct frame is integral power of 2 times of the length of the lost frame. The compensation module 4 is connected to the data sequence obtaining module 3, and adapted to perform a spectrum interpolation on the lost frame according to the data sequence to obtain a compensated data frame.

Figure 6:
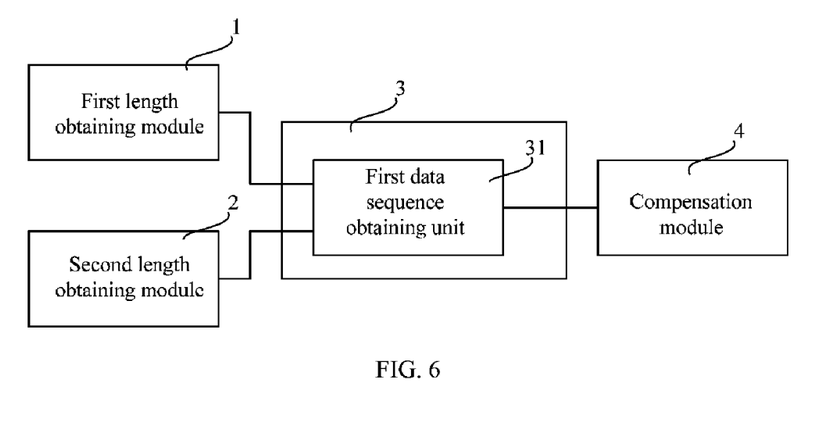
FIG. 6 is a schematic structural view of a frame compensation system according to a second embodiment of the present invention.

FIG. 6 is a schematic structural view of a frame compensation system according to a second embodiment of the present invention. Compared with the above embodiment, in this embodiment, the data sequence obtaining module 3 further includes a first data sequence obtaining unit 31. The first data sequence obtaining unit 31 is connected to the first length obtaining module 1 and the second length obtaining module 2, and adapted to select a data sequence with the same length as the length of the lost frame from the correct frame according to the following formula, when determining that the length of the correct frame is positive integral power of 2 times of the length of the lost frame:

$$X2'(k)=X2(2^n \cdot k), k=1, 2, \ldots, L$$

In the above formula, X2 is a data sequence of the correct frame, X2' is the selected data sequence, n is a positive integer, and L is the length of the lost frame.

Figure 7:
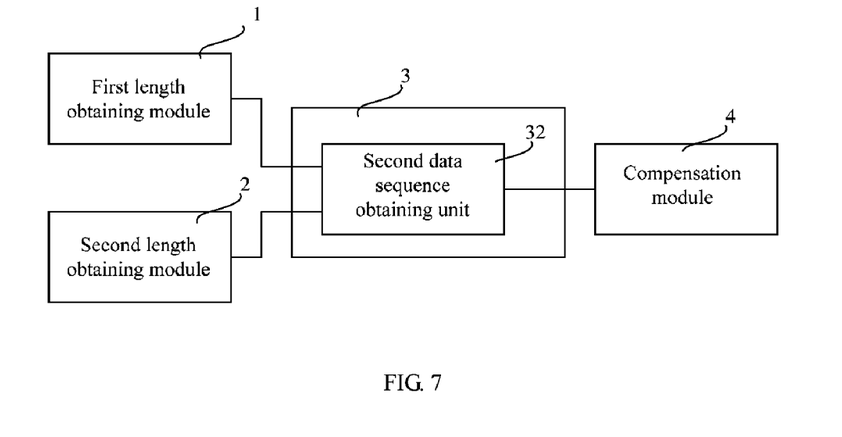
FIG. 7 is a schematic structural view of a frame compensation system according to a third embodiment of the present invention.

FIG. 7 is a schematic structural view of a frame compensation system according to a third embodiment of the present invention. Compared with the first embodiment, in this embodiment, the data sequence obtaining module 3 further includes a second data sequence obtaining unit. The second data sequence obtaining unit is connected to the first length obtaining module and the second length obtaining module, and adapted to obtain a data sequence with the same length as the length of the lost frame by interpolating data into the correct frame according to the following formula, when it is determined that the length of the correct frame is negative integral power of 2 times of the length of the lost frame:

$$X2'(k) = \begin{cases} X2\left(\dfrac{k}{2^n}\right), & k = 2^n, 2 \cdot 2^n, 3 \cdot 2^n \ldots, L \\ \left(1 - \dfrac{\mathrm{mod}\left(\dfrac{k}{2^n}\right)}{2^n}\right) \cdot X2\left(\left[\dfrac{k}{2^n}\right]\right) + & k = 1, \ldots, L-1, \text{ and} \\ \dfrac{\mathrm{mod}\left(\dfrac{k}{2^n}\right)}{2^n} \cdot X2\left(\left[\dfrac{k}{2^n}\right] + 1\right), & k \neq 2^n, 2 \cdot 2^n, 3 \cdot 2^n \ldots, L \end{cases}$$

In the above formula, X2 is the data sequence of the correct frame, X2' is the data sequence obtained after the data interpolation, n is a positive integer, L is the length of the lost frame, [ ] is a round down operator, and mod is a modulus operator.

According to the system in the above embodiments of the present invention, lost frames in various formats are compensated according to correct frames in various formats, so that the limitation of the related art that data frames in formats other than the TCX1024 frame cannot be compensated is eliminated, and the effect for compensating data frames is better than that of filling comfort noises.

It will be apparent to those skilled in the art that various modifications and variations can be made to the present invention without departing from the scope or spirit of the invention. In view of the foregoing, it is intended that the present invention cover modifications and variations of this invention provided that they fall within the scope of the following claims and their equivalents.

What is claimed is:

1. A frame compensation method in a codec using a transform coded excitation (TCX) coding mode and implemented by a data processing equipment, comprising:

obtaining a length of a lost frame and a length of a correct frame;

determining that the length of the correct frame is an integral power of two (2) times of the length of the lost frame, and obtaining a data sequence having the length of the lost frame according to the correct frame; and compensating the lost frame according to the data sequence to obtain a compensated data frame;

if the length of the correct frame is a positive integral power of two (2) times of the length of the lost frame, the step of obtaining the data sequence with the same length as the length of the lost frame according to the correct frame further comprises obtaining the data sequence having the length of the lost frame according to data at positions of integral multiples of the positive integral power of two (2) in the correct frame; or if the length of the correct frame is a negative integral power of two (2) times of the length of the lost frame, the step of obtaining the data sequence with the same length as the length of the lost frame according to the correct frame further comprises: obtaining the data sequence with the same length as the length of the lost frame by interpolating data into the correct frame according to amplitudes and phases of the data of the correct frame.

2. The frame compensation method according to claim 1, wherein the data sequence having the length of the lost frame is selected from the correct frame according to the following formula:

$$X2'(k)=X2(2^n \cdot k), k=1, 2, \ldots, L$$

wherein X2 is a data sequence of the correct frame, X2' is the selected data sequence, n is a positive integer, and L is the length of the lost frame.

3. The frame compensation method according to claim 1, wherein the data is interpolated into the correct frame according to the following formula:

$$X2'(k) = \begin{cases} X2\left(\dfrac{k}{2^n}\right), & k = 2^n, 2\cdot 2^n, 3\cdot 2^n \ldots, L \\ \left(1 - \dfrac{\mathrm{mod}\left(\dfrac{k}{2^n}\right)}{2^n}\right)\cdot X2\left(\left[\dfrac{k}{2^n}\right]\right) + \\ \dfrac{\mathrm{mod}\left(\dfrac{k}{2^n}\right)}{2^n}\cdot X2\left(\left[\dfrac{k}{2^n}\right]+1\right), & \begin{array}{l} k = 1, \ldots, L-1, \text{ and} \\ k \neq 2^n, 2\cdot 2^n, 3\cdot 2^n \ldots, L \end{array} \end{cases}$$

wherein X2 is a data sequence of the correct frame, X2' is a data sequence obtained from the data interpolation, n is a positive integer, L is the length of the lost frame, [] is a round down operator, and mod is a modulus operator.

4. The frame compensation method according to claim 1, wherein the lost frame and the correct frame are both transform coding excited frames.

5. The frame compensation method according to claim 4, wherein the correct frame is a correctly-received data frame prior to the lost frame in the received data.

6. The frame compensation method according to claim 1, wherein the integral power of two (2) comprises $2^{-1}$, $2^0$, or $2^1$.

7. The frame compensation method according to claim 6, wherein the length of the lost frame comprises 1024, 512, or 256.

8. The frame compensation method according to claim 1, wherein upon receiving the lost frame, the method further comprises:
determining the lost frame is not a transform coding excited frame; and
performing a non-transform coding frame loss compensation operation.

9. The frame compensation method according to claim 1, wherein upon receiving the correct frame, the method further comprises:
determining the correct frame is not a transform coding excited frame; and
filling comfort noises into the lost frame.

10. The frame compensation method according to claim 1, wherein the compensating the lost frame according to the data sequence further comprises performing a spectrum interpolation on the data sequence.

11. A frame compensation system, comprising:
a first length obtaining module for obtaining a length of a lost frame;
a second length obtaining module for obtaining a length of a correct frame;
a data sequence obtaining module, connected to the first length obtaining module and the second length obtaining module, for obtaining a data sequence with the same length as the length of the lost frame according to the correct frame when determining that the length of the correct frame is an integral power of two (2) times of the length of the lost frame; and
a compensation module, connected to the data sequence obtaining module, for compensating the lost frame according to the data sequence to obtain a compensated data frame;
wherein the data sequence obtaining module further comprises:
a first data sequence obtaining unit, connected to the first length obtaining module and the second length obtaining module, for obtaining the data sequence having the length of the lost frame according to data at positions of integral multiples of a positive integral power of two (2) in the correct frame when determining that the length of the correct frame is the positive integral power of two (2) times of the length of the lost frame; or
a second data sequence obtaining unit, connected to the first length obtaining module and the second length obtaining module, for obtaining the data sequence having the length of the lost frame by interpolating data into the correct frame according to amplitudes and phases of the data of the correct frame when determining that the length of the correct frame is a negative integral power of two (2) times of the length of the lost frame.

* * * * *